United States Patent
Sato et al.

(10) Patent No.: US 8,470,904 B2
(45) Date of Patent: Jun. 25, 2013

(54) RADIATION-CURABLE INK COMPOSITION, INK JET RECORDING METHOD, AND RECORDED MATTER

(75) Inventors: Chigusa Sato, Shiojiri (JP); Toshiyuki Miyabayashi, Shiojiri (JP); Satoru Miura, Matsumoto (JP); Toru Saito, Minowa-machi (JP); Hiroki Nakane, Matsumoto (JP); Jun Ito, Shimosuwa-machi (JP); Taketoshi Kagose, Shiojiri (JP); Hiroaki Kida, Matsumoto (JP); Hiroyuki Kajimoto, Matsumata (JP)

(73) Assignee: Seiko Epson Corporation (JP)

( * ) Notice: Subject to any disclaimer, the term of this patent is extended or adjusted under 35 U.S.C. 154(b) by 87 days.

(21) Appl. No.: 12/979,912

(22) Filed: Dec. 28, 2010

(65) Prior Publication Data

US 2011/0159251 A1 Jun. 30, 2011

(30) Foreign Application Priority Data

Dec. 28, 2009 (JP) .................................. 2009-297010

(51) Int. Cl.
*C08F 2/46* (2006.01)
*B32B 3/10* (2006.01)

(52) U.S. Cl.
USPC .......................... 522/186; 427/511; 428/195.1

(58) Field of Classification Search
USPC ....................................................... 522/186
See application file for complete search history.

(56) References Cited

U.S. PATENT DOCUMENTS

| | | | |
|---|---|---|---|
| 6,362,249 B2 * | 3/2002 | Chawla | 522/182 |
| 7,091,257 B2 * | 8/2006 | Greer, IV | 522/96 |
| 7,151,123 B2 * | 12/2006 | Ramsey | 522/96 |
| 2006/0158493 A1 | 7/2006 | Nakano et al. | |
| 2006/0209098 A1 * | 9/2006 | Fuchs et al. | 347/1 |
| 2006/0222831 A1 * | 10/2006 | Sloan | 428/195.1 |
| 2007/0291080 A1 * | 12/2007 | Nakamura | 347/52 |
| 2009/0197055 A1 * | 8/2009 | Yokoi | 428/195.1 |

FOREIGN PATENT DOCUMENTS

| | | |
|---|---|---|
| JP | 2006-199924 A | 8/2006 |
| JP | 2007-131754 A | 5/2007 |
| JP | 2008-7687 A | 1/2008 |
| JP | 2009-35650 A | 2/2009 |
| WO | WO 9850317 A1 * | 11/1998 |

OTHER PUBLICATIONS

Machine English Translation of JP2007-131754A Published May 31, 2007.
Machine English Translation of JP2008-7687A Published Jan. 17, 2008.
Machine English Translation of JP2009-35650A Published Feb. 19, 2009.

* cited by examiner

*Primary Examiner* — Vu A Nguyen
(74) *Attorney, Agent, or Firm* — Harness, Dickey & Pierce, P.L.C.

(57) ABSTRACT

Provided are a radiation-curable ink composition including phenoxyethyl acrylate (A) in an amount of from 20 to 55 mass % of the total reaction components, a multifunctional acrylate (B) in an amount of from 20 to 50 mass % of the total reaction components, and a black pigment (F1); and a radiation-curable ink composition including phenoxyethyl acrylate (A) in an amount of from 20 to 55 mass % of the total reaction components, a multifunctional acrylate (B) in an amount of from 10 to 50 mass % of the total reaction components, and a yellow pigment (F2).

18 Claims, 2 Drawing Sheets

RADIATION-CURABLE INK COMPOSITION, INK JET RECORDING METHOD, AND RECORDED MATTER

BACKGROUND

1. Technical Field

The present invention relates to a radiation-curable ink composition and relates to an ink jet recording method and recorded matter using the ink composition.

2. Related Art

Recently, radiation-curable inks, which are cured by ultraviolet, electron beams, or other radiation, have been being developed. Such radiation-curable inks can dry rapidly and achieve recording prevented from bleeding of the inks in recording on non-absorbent media that do not or hardly absorb inks, such as plastic, glass, and coated paper. Such radiation-curable inks are composed of, for example, polymerizable monomers, polymerization initiators, pigments, and other additives.

Incidentally, a recorded matter where an image is recorded on a recording medium having flexibility, such as a polyethylene terephthalate resin or a vinyl chloride resin, may be stuck on an article having a curved surface, such as an automobile body. Since, in such purposes, the recorded matter is usually stretched and stuck on an article, it is desirable that the image recorded on the recording medium have a degree of stretch of 100% or more so that cracking and peeling do not occur even if the image is stretched and be provided with durability at the degree of stretch.

In known radiation-curable inks, in order to record flexible images having a degree of stretch of 100% or more, polymerizable monomers, such as a long-chain alkyl acrylate, a phenoxyethyl acrylate, an ethylene oxide adduct of a phenoxyethyl acrylate, or an acrylated amine compound, have been used (for example, see JP-A-2006-199924, JP-A-2007-131754, JP-A-2008-7687, and JP-A-2009-35650).

However, in black inks and yellow inks (in particular, black inks) among the above-mentioned radiation-curable inks that can record flexible images having degrees of stretch of 100% or more, agglomeration spots (gloss unevenness) have occurred on the surfaces of some recorded images. Such a phenomenon does not occur in cyan inks and magenta inks and is specific to black inks and yellow inks.

Furthermore, even in images recorded using radiation-curable inks containing specific polymerizable monomers as described above, cracking occurs within several hours if the images are maintained in the state that the recording media are also stretched (for example, at a degree of stretch of 100%), and problems such that the images are peeled off from the recording media are further caused.

SUMMARY

An advantage of some aspects of the invention is to provide black and yellow radiation-curable ink compositions that can impart excellent flexibility to recorded images and inhibit occurrence of agglomeration spots (gloss unevenness) on the surfaces of the images.

The invention can be achieved as the following aspects or application examples.

APPLICATION EXAMPLE 1

A radiation-curable ink composition according to an aspect of the invention includes:

phenoxyethyl acrylate (A) in an amount of from 20 to 55 mass % of the total reaction components;

a multifunctional acrylate (B) in an amount of from 20 to 50 mass % of the total reaction components; and a black pigment (F1).

APPLICATION EXAMPLE 2

A radiation-curable ink composition according to an aspect of the invention includes:

phenoxyethyl acrylate (A) in an amount of from 20 to 55 mass % of the total reaction components;

a multifunctional acrylate (B) in an amount of from 10 to 50 mass % of the total reaction components; and a yellow pigment (F2).

The radiation-curable ink composition according to the application example 1 or 2 is excellent in flexibility in recorded images and can inhibit occurrence of agglomeration spots (gloss unevenness) on the surfaces of the images, by combining the components as described above.

APPLICATION EXAMPLE 3

In the application example 1 or 2, the multifunctional acrylate (B) may be at least one selected from dipropylene glycol diacrylate, tripropylene glycol diacrylate, tetraethylene glycol diacrylate, tricyclodecane dimethanol diacrylate, and propoxylated neopentyl glycol diacrylate.

APPLICATION EXAMPLE 4

In any one of the application examples 1 to 3, the ink composition can further contain N-vinyl caprolactam (C) as a reaction component.

APPLICATION EXAMPLE 5

In any one of the application examples 1 to 4, the ink composition can further contain an aminoacrylate (D) as a reaction component.

APPLICATION EXAMPLE 6

In any one of the application examples 1 to 5, the ink composition can further contain a monofunctional acrylate (E) having an alicyclic structure as a reaction component.

APPLICATION EXAMPLE 7

In the application example 6, the monofunctional acrylate (E) having an alicyclic structure may be at least one selected from dicyclopentenyl acrylate, dicyclopentanyl acrylate, and dicyclopentenyloxyethyl acrylate.

APPLICATION EXAMPLE 8

In any one of the application examples 1 to 7, the ink composition can have a viscosity of from 10 to 40 mPa·s at 20° C. and a surface tension of from 20 to 30 mN/m at 20° C.

APPLICATION EXAMPLE 9

An ink jet recording method according to an aspect of the invention includes the steps of:

(a) discharging a radiation-curable ink composition according to any one of the application examples 1 to 8 onto a recording medium; and (b) irradiating the discharged radiation-curable ink composition with active radiation having a peak emission wavelength ranging from 350 to 400 nm using an active radiation source.

APPLICATION EXAMPLE 10

A recorded matter according to an aspect of the invention is that recorded by the ink jet recording method according to the application example 9.

BRIEF DESCRIPTION OF THE DRAWINGS

The invention will be described with reference to the accompanying drawings, where like numbers reference like elements.

DESCRIPTION OF EXEMPLARY EMBODIMENTS

Figure 1:
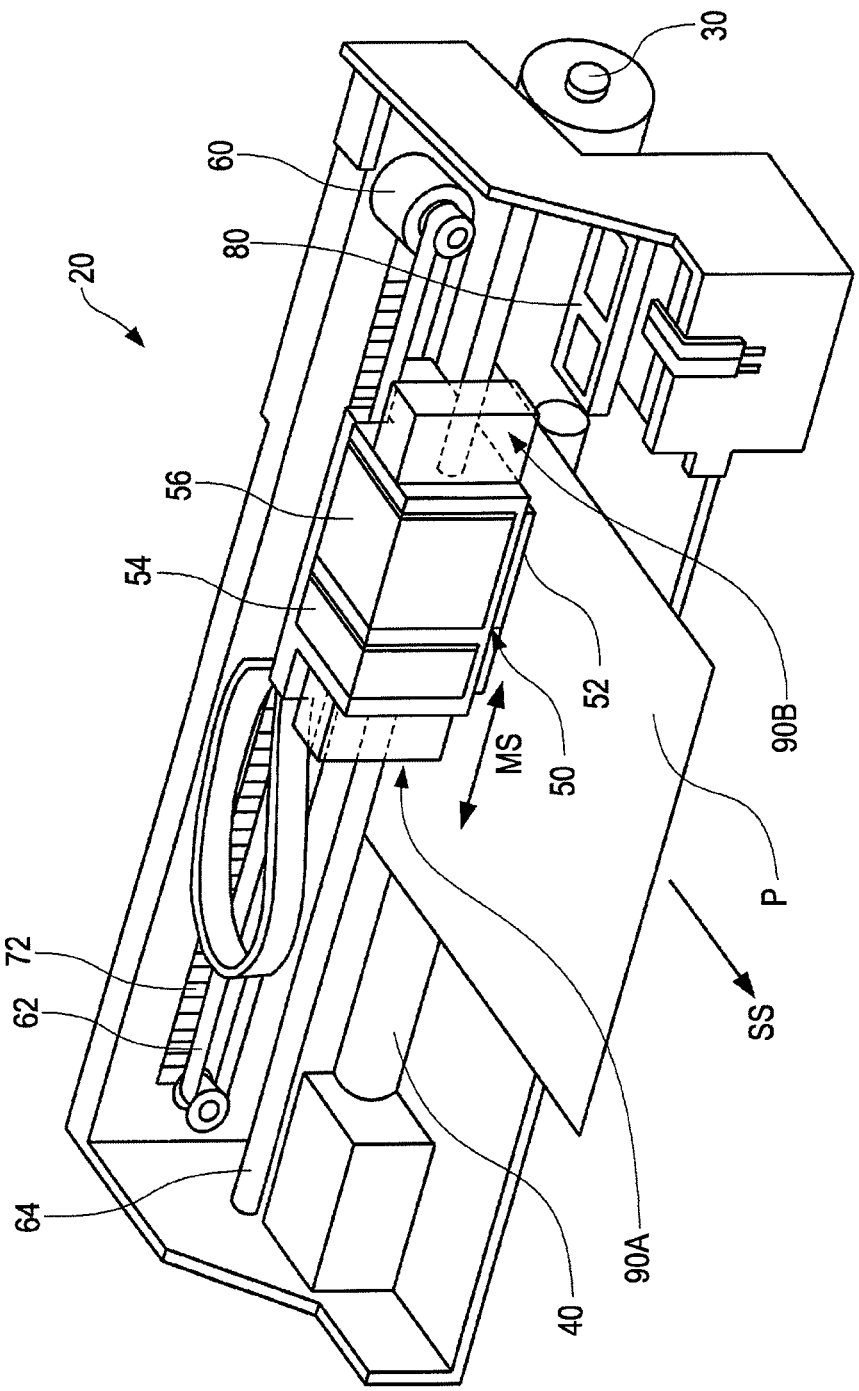
FIG. 1 is a perspective view of an ink jet recording apparatus capable of being applied to an ink jet recording method according to an embodiment.

Preferred embodiments of the invention will be described below. The embodiments described below merely describe examples of the invention. The invention is not limited to the following embodiments and can include various modifications performed within the scope of the invention. Note that the term "image" in the invention refers to a printed pattern formed of dots and includes text printing and solid printing.

1. RADIATION-CURABLE INK COMPOSITION

The radiation-curable ink composition according to the invention includes the following two aspects.

A radiation-curable (black) ink composition according to an embodiment of the invention includes phenoxyethyl acrylate (A) in an amount of from 20 to 55 mass % of the total reaction components, a multifunctional acrylate (B) in an amount of from 20 to 50 mass % of the total reaction components, and a black pigment (F1).

A radiation-curable (yellow) ink composition according to an embodiment of the invention includes phenoxyethyl acrylate (A) in an amount of from 20 to 55 mass % of the total reaction components, a multifunctional acrylate (B) in an amount of from 10 to 50 mass % of the total reaction components, and a yellow pigment (F2).

Each component used in the respective embodiments will be described in detail below.

1.1. Reaction Component

The term "reaction components" in the invention refers to polymerizable monomers used for forming polymers and does not refer to additives other than then the polymerizable monomers, such as pigments, dispersants, photopolymerization initiators, and slip agents. The reaction components used in the embodiments will be described in detail below.

1.1.1. Phenoxyethyl Acrylate (A)

The radiation-curable ink composition according to an embodiment includes phenoxyethyl acrylate (A) in an amount of from 20 to 55 mass % of the total reaction components. The radiation-curable ink composition according to the embodiment can improve flexibility of an image recorded on a recording medium by containing a predetermined amount of component (A) therein.

Component (A) also functions as a solvent for dissolving a photopolymerization initiator described below. In addition, component (A) shows good reducibility for other acrylate monomers and does not inhibit functions of other acrylate monomers.

When the total mass of the reaction components is assumed to be 100 mass %, the content of component (A) is from 20 to 55 mass %, preferably from 25 to 55 mass %, and more preferably from 40 to 55 mass %. By controlling the content of component (A) in the total reaction components to the above-mentioned range, an image recorded on a recording medium can be flexible and have a large degree of stretch, and cracking and peeling do not occur in the image even if the image is maintained in the state that the recording medium is also stretched. If the content of component (A) is lower than 20 mass of the total reaction components, the degree of stretch of an image recorded on a recording medium becomes small, causing cracking and peeling in the image and significantly reducing the stretching resistance of the image. Furthermore, a photopolymerization initiator described below may not be completely dissolved in the ink composition. On the other hand, if the content of component (A) is higher than 55 mass %, the curing property of an image recorded on a recording medium may be deteriorated. In addition, since the content of component (B) is relatively reduced, agglomeration spots (gloss unevenness) may occur on the surface of an image recorded on a recording medium.

1.1.2. Multifunctional Acrylate (B)

When a black pigment is used, the radiation-curable ink composition according to the embodiment includes a multifunctional acrylate (B) in an amount of from 20 to 50 mass of the total reaction components. When a yellow pigment is used, the ink composition includes the multifunctional acrylate (B) in an amount of from 10 to 50 mass of the total reaction components. The radiation-curable ink composition according to the embodiment can inhibit occurrence of agglomeration spots (gloss unevenness) on the surface of an image recorded on a recording medium by containing a predetermined amount of component (B) therein.

The mechanism of generating agglomeration spots (gloss unevenness) on the surface of an image recorded on a recording medium can be understood as follows: Black pigments and yellow pigments have high tendencies of absorbing part of active radiation (particularly in the ultraviolet region) compared to other pigments such as cyan pigments and magenta pigments. Therefore, in the black inks and the yellow inks, since the energy of irradiated active radiation becomes insufficient for completely curing a film discharged on a recording medium, curing may occur only near the surface of the film and be incomplete in the inside of the film or may take a long period of time. It is thought that the uncured ink composition present in the inside of the film, for example, randomly flows before curing to cause agglomeration spots (gloss unevenness). The tendency of causing agglomeration spots (gloss unevenness) is significant, in particular, in black inks containing black pigments.

Multifunctional acrylate (B) has a function as a cross-linking agent for enhancing the reactivity of a film discharged on a recording medium and, therefore, can increase the reactivity of a black ink or a yellow ink against the film. It is thought that this can inhibit occurrence of agglomeration spots (gloss unevenness) on the surface of an image recorded on a recording medium by the radiation-curable ink composition according to the embodiment.

Examples of multifunctional acrylate (B) include bifunctional acrylates, trifunctional acrylates, and tetrafunctional acrylates.

Examples of the bifunctional acrylate include 1,4-butanediol diacrylate, 1,6-hexanediol diacrylate, 1,9-nonanediol diacrylate, 1,10-decanediol diacrylate, 2-hydroxy-3-acryloyloxypropyl methacrylate, ethylene glycol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, triisopropylene glycol diacrylate, 1,3-butylene glycol diacrylate, poly(butanediol)diacrylate, tricyclodecane dimethanol diacrylate, ethoxylated bisphenol A diacrylate, propoxylated neopentyl glycol diacrylate, and propoxylated bisphenol A diacrylate.

Examples of the trifunctional acrylate include trimethylolpropane triacrylate, pentaerythrithol triacrylate, ethoxylated isocyanurate triacrylate, and s-caprolacton-modified tris-(2-acryloxyethyl)isocyanurate.

Examples of the tetrafunctional acrylate include pentaerythritol tetraacrylate, ethoxylated pentaerythritol tetraacrylate, and ditrimethylolpropane tetraacrylate.

The above-mentioned bifunctional, trifunctional, and tetrafunctional acrylates may be used alone or in combination of two or more.

Among the above-mentioned multifunctional acrylates, the bifunctional acrylates are preferred from the viewpoint of flexibility of images recorded on recording media, and dipropylene glycol diacrylate, tripropylene glycol diacrylate, tetraethylene glycol diacrylate, tricyclodecane dimethanol diacrylate, and propoxylated neopentyl glycol diacrylate are more preferred.

When the total mass of the reaction components is assumed to be 100 mass %, the content of multifunctional acrylate (B) in a black ink containing a black pigment is from 20 to 50 mass % and preferably from 30 to 50 mass %. As described above, since the tendency of causing agglomeration spots (gloss unevenness) is significant, in particular, in black inks, it is necessary to control the content of component (B) in the black ink to 20 mass % or more. If the content of multifunctional acrylate (B) is lower than 20 mass % of the total reaction components, agglomeration spots (gloss unevenness) may occur on the surface of an image recorded on a recording medium. In addition, there is a tendency that scratch resistance of an image recorded on a recording medium is deteriorated. On the other hand, if the content of multifunctional acrylate (B) is higher than 50 mass %, an image recorded on a recording medium tends to decrease its flexibility, and agglomeration spots (gloss unevenness) tend to easily occur in the image recorded on the recording medium. In addition, since the viscosity of the radiation-curable ink composition is increased, clogging of nozzles of ink jet printers tends to easily occur.

When the total mass of the reaction components is assumed to be 100 mass %, the content of multifunctional acrylate (B) in a yellow ink containing a yellow pigment is from 10 to 50 mass % and preferably from 20 to 50 mass %. As described above, it has been confirmed that the tendency of causing agglomeration spots (gloss unevenness) of yellow inks is smaller than that of black inks. Therefore, a content of component (B) of 10 mass % or more is sufficient. If the content of component (B) is out of the above-mentioned range, tendencies similar to those in the black inks are caused.

1.1.3. N-Vinyl Caprolactam (C)

The radiation-curable ink composition according to the embodiment may further contain N-vinyl caprolactam (C) as a reaction component. In the radiation-curable ink composition according to the embodiment containing N-vinyl caprolactam (C) as the reaction component, the adhesion between a recording medium and an image recorded thereon can be enhanced. In addition, N-vinyl caprolactam (C) has a good curing property and shows good reducibility for other acrylate monomers and does not inhibit functions of other acrylate monomers.

When the total mass of the reaction components is assumed to be 100 mass %, the content of N-vinyl caprolactam (C) is preferably from 5 to 20 mass % and more preferably 10 to 15 mass %. If the content of N-vinyl caprolactam (C) in the total reaction components is lower than 5 mass %, the adhesion between a recording medium and an image recorded thereon may not be enhanced. On the other hand, if the content is higher than 20 mass %, since the storage stability of the radiation-curable ink composition may not be good, the ink composition may not be suitable to be used as a product.

1.1.4. Aminoacrylate (D)

The radiation-curable ink composition according to the embodiment may further contain an aminoacrylate (D) as a reaction component. In the radiation-curable ink composition according to the embodiment containing aminoacrylate (D) as the reaction component, the copolymerization reaction of a film discharged on a recording medium can be accelerated. As an example of specific functional effects, the amount of energy necessary for curing a film by irradiation of active radiation having a maximum emission wavelength ranging from 350 to 400 nm can be reduced by that the ink composition contains a predetermined amount of aminoacrylate (D) in the total reaction components and a polymerization initiator described below. By doing so, the film can be cured rapidly, even if active radiation is irradiated using a light source emitting low energy, such as an LED. Note that the term "curing" in the invention refers to a state that no stickiness is felt when a recorded matter is touched with a finger, that is, refers to a so-called tack-free state.

Examples of commercially available aminoacrylate (D) include EBECRYL 7100 (a product of Daicel-Cytec Company Ltd.) and CN371 (a product of Sartomer Company).

When the total mass of the reaction components is assumed to be 100 mass %, the content of aminoacrylate (D) is preferably from 1 to 5 mass. If the content of aminoacrylate (D) in the total reaction components is lower than 1 mass %, the copolymerization reaction does not smoothly progress, and the curing property of an image recorded on a recording medium may be insufficient. However, a content of higher than 5 mass % does not improve the effect of accelerating the copolymerization reaction and is therefore an excessive amount, which is not preferred. In addition, the viscosity of the ink composition is increased, which may deteriorate ink-discharging stability in an ink jet recording apparatus and may cause yellowing of an image recorded on a recording medium.

1.1.5. Monofunctional Acrylate (E) Having an Alicyclic Structure

The radiation-curable ink composition according to the embodiment may further contain a monofunctional acrylate (E) having an alicyclic structure as a reaction component. In the radiation-curable ink composition according to the embodiment containing the monofunctional acrylate (E) having an alicyclic structure as the reaction component, since the viscosity of the monofunctional acrylate is generally low, the radiation-curable ink composition can have a low viscosity (from 10 to 40 mPa·s at 20° C.) suitable for an ink jet recording system. Furthermore, the bulky alicyclic structure can provide toughness to an image recorded on a recording medium, improving the scratch resistance of the image.

Examples of monofunctional acrylate (E) having an alicyclic structure include dicyclopentenyloxyethyl acrylate, dicyclopentenyl acrylate, dicyclopentanyl acrylate, isobornyl acrylate, trimethylolpropane formal monoacrylate, adamantyl acrylate, oxetane acrylate, and 3,3,5-trimethylcyclohexane acrylate. These monofunctional acrylate monomers may be used alone or in combination of two or more.

When the total mass of the reaction components is assumed to be 100 mass %, the content of monofunctional acrylate (E) having an alicyclic structure is preferably from 5 to 50 mass %. If the content of monofunctional acrylate (E) having an alicyclic structure in the total reaction components is lower than 5 mass %, the viscosity of the ink composition is increased, which may deteriorate the ink-discharging stability in an ink jet recording apparatus. On the other hand, if the content is higher than 50 mass % so that the content of component (A) is relatively reduced, the flexibility of an image recorded on a recording medium tends to be reduced to readily cause cracking in the image recorded on the recording medium. When the content of component (B) is relatively decreased, agglomeration spots (gloss unevenness) may occur on the surface of an image recorded on a recording medium.

1.2. Black Pigment (F1)/Yellow Pigment (F2)

The radiation-curable ink composition according to the embodiment contains either a black pigment or a yellow pigment, in addition to the above-described reaction components.

A black pigment that can be used in the embodiment is, for example, carbon black. Examples of the carbon black include C.I. pigment black 7, specifically, products of Mitsubishi Chemical Corporation, such as No. 2300, No. 900, MCF88, No. 33, No. 40, No. 45, No. 52, MA7, MA8, MA100, and No. 2200B; products of Columbia Chemical Company, such as Raven 5750, Raven 5250, Raven 5000, Raven 3500, Raven 1255, and Raven 700; products of Cabot Corporation, such as Regal 400R, Regal 330R, Regal 660R, Mogul L, Mogul 700, Monarch 800, Monarch 880, Monarch 900, Monarch 1000, Monarch 1100, Monarch 1300, and Monarch 1400; products of Degussa Co., such as Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4; and products of Ciba Japan K.K., such as Microlith Black C-K.

Examples of the yellow pigment that can be used in the embodiment include C.I. pigment yellow 1, 2, 3, 12, 13, 14, 16, 17, 73, 74, 75, 83, 93, 95, 97, 98, 109, 110, 114, 120, 128, 129, 138, 150, 151, 154, 155, 180, 185, and 213.

The pigment that can be used in the embodiment preferably has an average particle diameter ranging from 10 to 200 nm, more preferably from 50 to 150 nm.

The amount of a pigment contained in the radiation-curable ink composition according to the embodiment is preferably from 0.1 to 25 parts by mass and more preferably 0.5 to 15 parts by mass based on 100 parts by mass of the total reaction components.

The radiation-curable ink composition according to the embodiment may contain a dispersant in order to increase the dispersing property of the pigment. Examples of the dispersant that can be used in the embodiment include high-molecular dispersants such as Solsperse 3000, Solsperse 5000, Solsperse 9000, Solsperse 12000, Solsperse 13240, Solsperse 17000, Solsperse 24000, Solsperse 26000, Solsperse 28000, and Solsperse 36000, which are available from Lubrizol Corporation; and Discole N-503, Discole N-506, Discole N-509, Discole N-512, Discole N-515, Discole N-518, and Discole N-520, which are available from Dai-ichi Kogyo Seiyaku Co., Ltd.

1.3. Photopolymerization Initiator

The radiation-curable ink composition according to the embodiment may further contain a photopolymerization initiator, in addition to the above-described reaction components. The photopolymerization initiator is a collective term of compounds having a function of initiating copolymerization reaction of the above-mentioned reaction components by irradiating the radiation-curable ink composition discharged on a recording medium with active radiation.

Examples of the photopolymerization initiator include known photopolymerization initiators such as alkylphenone-based photopolymerization initiators, acyl phosphine oxide-based photopolymerization initiators, titanocene-based photopolymerization initiators, and thioxanthone-based photopolymerization initiators. Among them, 2,4,6-trimethylbenzoyl-diphenyl-phosphine oxide, which is excellent in compatibility with the above-mentioned reaction components, molecule-cleaving type initiators such as bis(2,4,6-trimethylbenzoyl)-phenylphosphine oxide, which has a broad light absorbing spectrum, and hydrogen abstraction-type initiators such as diethyl thioxantone are preferred. In the acyl phosphine oxide-based photopolymerization initiators, since the chromophore structure after its photocleavage is highly different from that before the photocleavage, the absorption spectrum largely changes to cause a decrease in absorption, so-called photobleaching. Accordingly, the acyl phosphine oxide-based photopolymerization initiators are preferred. In addition, though the absorption of the acyl phosphine oxide-based photopolymerization initiators ranges from the UV region to the VL region, the initiators hardly cause yellowing and are also excellent in internal curing. Therefore, the initiators are particularly preferred for transparent films having large thicknesses and films containing pigments having high hiding power. In the thioxantone-based photopolymerization initiators, the initiators react with oxygen remaining in the reaction system after the photocleavage to reduce the concentration of oxygen in the system. Since the degree of inhibition of radical polymerization can be reduced by the amount of decrease in concentration of oxygen, the curing property of the surface can be improved. Accordingly, the thioxantone-based photopolymerization initiators are preferred. Furthermore, a combination of an acyl phosphine-based photopolymerization initiator and a thioxanthone-based photopolymerization initiator is particularly preferred. These photopolymerization initiators may be used alone, but the use in combination of two or more can maximize the respective characteristics.

When the total mass of the reaction components is assumed to be 100 mass %, the content of the photopolymerization initiator is preferably from 1 to 20 parts by mass and more preferably from 5 to 15 parts by mass. When the content is less than 1 part by mass based on 100 parts by mass of the total reaction components, the function of the photopolymerization initiator may not be exhibited, and the curing property of an image recorded on a recording medium may be insufficient. However, a content of higher than 20 parts by mass does not improve the effect of initiating the copolymerization reaction and is therefore an excessive amount, which is not preferred.

1.4. Other Additives

The radiation-curable ink composition according to the embodiment may contain a reaction component other than the above-mentioned reaction components and an additive such as a slip agent or a polymerization inhibitor, according to need.

It is preferable that the radiation-curable ink composition according to the embodiment do not contain organic solvents and be a solventless radiation-curable ink composition.

The reaction component other than the above-mentioned reaction components is preferably an acrylate monomer having a glass transition temperature of 0° C. or less as shown below, which does not deteriorate the flexibility of an image recorded on a recording medium.
Long-Chain Alkyl Acrylate Examples of the long-chain alkyl acrylate include 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, isomyristyl acrylate, and isostearyl acrylate.
Polyethylene Oxide or Polypropylene Oxide Adduct Monofunctional Acrylate Examples of the polyethylene oxide or polypropylene oxide adduct monofunctional acrylate include (poly)ethylene glycol monoacrylate, (poly)ethylene glycol acrylate methyl ester, (poly)ethylene glycol acrylate ethyl ester, (poly)ethylene glycol acrylate phenyl ester, (poly)propylene glycol monoacrylate, (poly)propylene glycol monoacrylate phenyl ester, (poly)propylene glycol acrylate methyl ester, (poly)propylene glycol acrylate ethyl ester, methoxytriethylene glycol acrylate, methoxydipropylene glycol acrylate, ethoxydiethylene glycol acrylate, and methoxy-polyethylene glycol acrylate.
Phenoxyethyl Acrylate Modification Examples of the phenoxyethyl acrylate modification include phenoxydiethylene glycol acrylate, phenoxy-polyethylene glycol acrylate, 2-hydroxy-3-phenoxypropyl acrylate, and nonylphenol EO adduct acrylate.

The radiation-curable ink composition according to the embodiment may contain a slip agent. The slip agent that can be used in the embodiment is preferably a silicone-based surfactant and more preferably polyester modified silicone or polyether modified silicone. Specifically, examples of the polyester modified silicone include BYK-347, BYK-348, BYK-UV 3500, BYK-UV 3510, and BYK-UV 3530 (which are products of BYK-Chemie Japan K.K.), and examples of the polyether modified silicone include BYK-3570 (which is a product of BYK-Chemie Japan K.K.).

The radiation-curable ink composition according to the embodiment may contain a polymerization inhibitor. Examples of the polymerization inhibitor that can be used in the embodiment include hydroquinone, benzoquinone, and p-methoxyphenol.

1.5. Physical Properties

The radiation-curable ink composition according to the embodiment preferably has a viscosity of from 10 to 40 mPa·s at 20° C. and more preferably from 15 to 25 mPa·s. When the radiation-curable ink composition has a viscosity in this range at 20° C., a nozzle can discharge a suitable amount of the radiation-curable ink composition, and curved flight or scattering of the radiation-curable ink composition can be further decreased. Therefore, the ink composition can be suitably used in an ink jet recording apparatus. The viscosity can be measured using a viscoelasticity meter MCR-300 (a product of Physica) at an environment of 20° C. by reading the viscosity at a shear rate of 200, while the shear rate being increased from 10 to 1000.

The radiation-curable ink composition according to the embodiment preferably has a surface tension of from 20 to 30 mN/m at 20° C. When the radiation-curable ink composition has a surface tension in this range at 20° C., the radiation-curable ink composition hardly makes a liquid-repellent nozzle wet. With this, the nozzle can discharge a suitable amount of the radiation-curable ink composition, and curved flight or scattering of the radiation-curable ink composition can be further decreased. Therefore, the ink composition can be suitably used in an ink jet recording apparatus. The surface tension can be measured using an auto surface tensiometer CBVP-Z (a product of Kyowa Interface Science Co., Ltd.) at an environment of 20° C. by determining the surface tension when a platinum plate is wetted with the ink.

2. INK JET RECORDING METHOD

An ink jet recording method according to an embodiment, of the invention includes the steps of (a) discharging the above-described radiation-curable ink composition on a recording medium and (b) irradiating the discharged radiation-curable ink composition with active radiation having a peak emission wavelength ranging from 350 to 400 nm using an active radiation source.

Each step of the ink jet recording method according to the embodiment will be described below.

2.1. Step (a)

This step is a step of discharging the above-described radiation-curable ink composition on a recording medium.

Since the radiation-curable ink composition has been described, detailed description thereof is omitted.

The recording medium is not particularly limited, and examples thereof include plastics such as polyvinyl chloride, polyethylene terephthalate, polypropylene, polyethylene, and polycarbonate; these plastics having processed surfaces; glass; and coated paper.

The radiation-curable ink composition can be discharged by, for example, using an ink jet recording apparatus described below.

FIG. 1 is a perspective view of an ink jet recording apparatus that can be used in the ink jet recording method according to the embodiment.

The ink jet recording apparatus 20 shown in FIG. 1 includes a motor 30 for transporting a recording medium P in a sub-scanning direction SS, a platen 40, a printing head 52 serving as a recording head that sprays microparticles of the radiation-curable ink composition from a head nozzle to discharge them onto the recording medium P, a carriage 50 on which the printing head 52 is mounted, a carriage motor 60 for moving the carriage 50 in a main-scanning direction MS, and a pair of active radiation-irradiating devices 90A and 90B for irradiating with active radiation the ink-adhering surface of the recording medium P on which the radiation-curable ink composition has been discharged by the printing head 52.

The carriage 50 is towed by a tow belt 62 driven by the carriage motor 60 and moves along a guide rail 64.

The printing head 52 shown in FIG. 1 is a serial head that sprays three or more colors of inks for full-color printing and is provided with a large number of head nozzles for each color. The printing head 52 is mounted on the carriage 50 on which a black cartridge 54 being a black ink container containing a black ink which is supplied to the printing head 52 and a color ink cartridge 56 being a color ink container containing color inks which are supplied to the printing head 52 are mounted, in addition to the printing head 52. The ink contained in each of the cartridges 54 and 56 is the radiation-curable ink composition described above.

The ink jet recording apparatus 20 is provided with a capping device 80 for sealing the nozzle face of the printing head 52 during the stoppage at the home position (the position on the right side of FIG. 1) of the carriage 50. When the carriage 50 after completion of a printing job reaches above the capping device 80, the capping device 80 is automatically lifted by a mechanism (not shown) to seal the nozzle face of the printing head 52. By the capping, inks in the nozzles are prevented from drying. The control of positioning the carriage 50 is performed for, for example, precisely positioning the carriage 50 at the position of the capping device 80.

The radiation-curable ink composition can be discharged on a recording medium by using such an ink jet recording apparatus 20. By using the ink jet recording apparatus 20, the steps (a) and (b) can be sequentially performed by a single apparatus, without using separate apparatuses for respectively performing the steps (a) and (b).

2.2. Step (b)

This step is a step for irradiating the discharged radiation-curable ink composition with active radiation having a peak emission wavelength ranging from 350 to 400 nm using an active radiation source. According to this step, the radiation-curable ink composition discharged on the recording medium is cured by being irradiated with active radiation having a specific wavelength to record an image on the recording medium.

A case where the step (b) is performed using the above-described ink jet recording apparatus 20 will be described in detail below.

Figure 2:
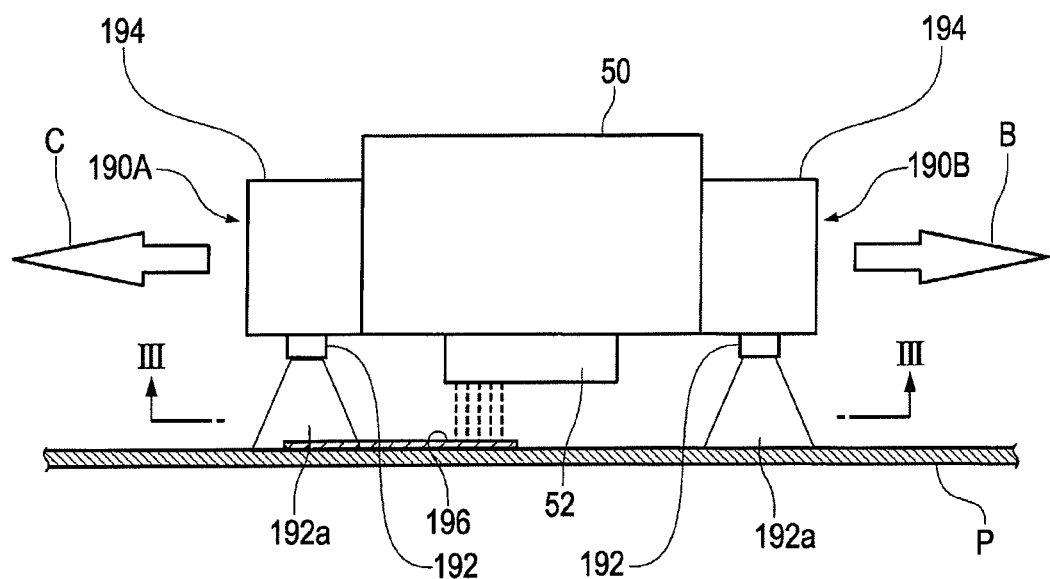
FIG. 2 is a front view of the active radiation-irradiating device shown in FIG. 1.
Figure 3:
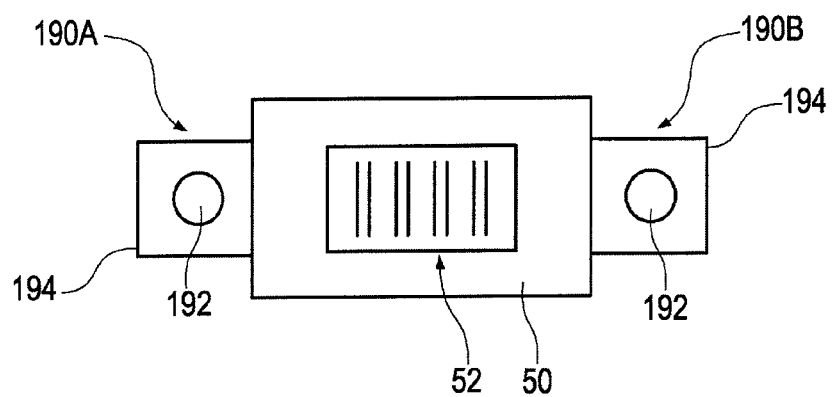
FIG. 3 is a fragmentary view taken in the direction of the arrows of FIG. 2.

FIG. 2 is a front view of the active radiation-irradiating devices 90A (corresponding to 190A in FIG. 2) and 90B (corresponding to 190B in FIG. 2) shown in FIG. 1. FIG. 3 is a fragmentary view taken in the direction of the arrows of FIG. 2.

As shown in FIGS. 1 to 3, the active radiation-irradiating devices 190A and 190B are respectively attached to the both ends along the moving direction of the carriage 50.

As shown in FIG. 2, the active radiation-irradiating device 190A attached on the left side of the printing head 52 performs active radiation irradiation against an ink layer 196 discharged on the recording medium P in rightward scanning in which the carriage 50 moves toward the right direction (the direction shown by the arrow B in FIG. 2). On the other hand, the active radiation-irradiating device 190B attached on the right side of the printing head 52 performs active radiation irradiation against the ink layer 196 discharged on the recording medium P in leftward scanning in which the carriage 50 moves toward the left direction (the direction shown by the arrow C in FIG. 2).

The active radiation-irradiating devices 190A and 190B each include a case 194 attached to the carriage 50 and align-supporting an active radiation source 192 and a light source-controlling circuit (not shown) for controlling on/off of emission by the active radiation source 192. As shown in FIGS. 2 and 3, each of the active radiation-irradiating devices 190A and 190B is provided with one active radiation source 192, but may be provided with two or more active radiation sources 192. The active radiation source 192 is preferably an LED or LD. By doing so, since equipment such as a filter is unnecessary, the active radiation source can be prevented from being increased in size, compared to a case where a mercury lamp, a metal halide lamp, or another lamp is used as the active radiation source. In addition, since the emitted active radiation is not absorbed by a filter, the intensity of the active radiation is not reduced, and therefore the radiation-curable ink composition can be efficiently cured.

The wavelengths of the radiation emitted by the active radiation sources 192 may be the same or different from each other. When the active radiation source 192 is an LED or LD, the peak emission wavelength of emitted active radiation may be in the range of about 350 to 400 nm.

According to the active radiation-irradiating devices 190A and 190B described above, as shown in FIG. 2, the ink layer 196 adhering on the recording medium P by being discharged from the printing head 52 is irradiated with active radiation 192*a* from the active radiation source 192 that irradiates on the recording medium P in the area near the printing head 52. As a result, the surface and the inside of the ink layer 196 can be cured.

Since the irradiation dose of the active radiation varies depending on the thickness of the ink layer 196 adhering on the recording medium P and cannot be therefore strictly specified, proper conditions are determined in each case. However, since the radiation-curable ink composition described above is used, the ink layer 196 can be sufficiently cured with an irradiation dose of from 300 to 1000 mJ/cm$^2$.

According to the ink jet recording apparatus 20, even in full-color printing of a relatively thin ink layer with the radiation-curable ink composition having a low viscosity, a plurality of radiation-curable ink compositions discharged on the recording medium P can be satisfactorily cured without causing problems such as bleeding and color mixing.

The structure of the ink jet recording apparatus 20 is not limited to that including the recording head, carriage, and active radiation source described above and can employ various configurations based on the purpose of the ink jet recording method according to the embodiment.

3. RECORDED MATTER

The recorded matter according to an embodiment of the invention is that recorded by the above-described ink jet recording method. Since an image recorded on a recording medium is that formed using the above-described radiation-curable ink composition, the image is excellent in flexibility and can be inhibited from causing agglomeration spots (gloss unevenness) on the surface thereof.

Purpose of the recorded matter according to the embodiment is not particularly limited, and the recorded matter can be used as an image recorded on the above-mentioned recording medium. Since the image recorded on the recording medium is excellent in flexibility, the recorded matter is particularly suitable for the purpose of being stuck on an article that is required to have a bending or stretching capability.

4. EXAMPLES

The invention will be more specifically described by Examples below, but is not limited to these Examples.

4.1. Preparation of Pigment Dispersion

4.1.1. Preparation of Black Pigment Dispersion

A mixture was prepared by adding phenoxyethyl acrylate (a product of Osaka Organic Chemical Industry Ltd., trade name "V#192") to 15 parts by mass of a black pigment (a product of Ciba Japan K.K., trade name "Microlith Black C-K") being a colorant and 3 parts by mass of Solsperse 36000 (a product of Lubrizol Corporation) being a dispersant to make the total amount 100 parts by mass and mixing and stirring them. This mixture was subjected to dispersing treatment with zirconia beads (diameter: 1.5 mm) for 6 hours using a sand mill (a product of Yasukawa Seisakusyo Co., Ltd.). Then, the zirconia beads were separated with a separator to obtain a black pigment dispersion to be used in Examples and Comparative Examples.

4.1.2. Preparation of Yellow Pigment Dispersion

A mixture was prepared by adding phenoxyethyl acrylate (a product of Osaka Organic Chemical Industry Ltd., trade name "V#192") to 12 parts by mass of a yellow pigment (a product of Ciba Japan K.K., trade name "Cromophtal Yellow LA") being a colorant and 2.4 parts by mass of Solsperse 36000 (a product of Lubrizol Corporation) being a dispersant to make the total amount 100 parts by mass and mixing and stirring them. This mixture was subjected to dispersing treatment with zirconia beads (diameter: 1.5 mm) for 6 hours using a sand mill (a product of Yasukawa Seisakusyo Co., Ltd.). Then, the zirconia beads were separated with a separator to obtain a yellow pigment dispersion to be used in Examples and Comparative Examples.

4.2. Preparation of Radiation-Curable Ink Composition

Reaction components, photopolymerization initiators, a slip agent, and a polymerization inhibitor were mixed to completely dissolve for obtaining composites shown in Tables 1 and 2, and the black pigment dispersion or the yellow pigment dispersion was dropped to each composite with stirring to give a pigment concentration shown in Table 1 or 2. After completion of the dropping, the mixture was stirred at ordinary temperature for 1 hour and was subsequently subjected to filtration through a membrane filter of 5 μm pore size to obtain each radiation-curable ink composition.

The components shown in Tables 1 and 2 are as follows:
Phenoxyethyl acrylate (a product of Osaka Organic Chemical Industry Ltd., trade name "V#192")
Tetraethylene glycol diacrylate (a product of Osaka Organic Chemical Industry Ltd., trade name "V#335HP")
Tripropylene glycol diacrylate (a product of Shin-Nakamura Chemical Co., Ltd. trade name "APG-200")
Dipropylene glycol diacrylate (a product of Shin-Nakamura Chemical Co., Ltd. trade name "APG-100")
N-Vinyl caprolactam (a product of BASF SE, trade name "N-Vinyl Caprolactam")
Aminoacrylate (a product of Daicel-Cytec Company Ltd., trade name "EBECRYL 7100")
Dicyclopentenyloxyethyl acrylate (Hitachi Chemical Company, Ltd., trade name "FA512AS")
Isobornyl acrylate (a product of Osaka Organic Chemical Industry Ltd., trade name "IBXA")
IRGACURE 819 (a product of Ciba Japan K.K., bis(2,4,6-trimethylbenzoyl)-phenylphosphine oxide, photopolymerization initiator)
DAROCUR TPO (a product of Ciba Japan K.K., 2,4,6-trimethylbenzoyl-diphenyl-phosphine oxide, photopolymerization initiator)
DETX (a product of Nippon Kayaku Co., Ltd., photosensitizer)
BYK-UV 3500 (a product of BYK-Chemie Japan K.K., polydimethylsiloxane having a polyether modified acryl group, slip agent)
p-Methoxyphenol (a product of Kanto Chemical Co., Ltd., polymerization inhibitor)
Carbon black (a product of Ciba Japan K.K., black pigment)
Pigment yellow 180 (a product of Ciba Japan K.K., yellow pigment)
Solsperse 36000 (a product of LUBRIZOL Corporation, dispersant)

4.3. Producing of Recorded Matter

Nozzles in columns were filled with respective radiation-curable ink compositions using an ink jet printer PX-G5000 (a product of Seiko Epson Corporation). Solid pattern images were printed on PVC films (a product of 3M, trade name "IJ180-10") at ordinary temperature and ordinary pressure by ink dots having a middle-sized diameter so that the thickness of each printed matter was 10 μm. The solid pattern images were cured by being subjected to first irradiation with UV light having a wavelength of 385 nm at an irradiation intensity of 100 mW/cm$^2$ and then second irradiation with UV light having a wavelength of 395 nm at an irradiation intensity of 1000 mW/cm$^2$ so that the accumulated light quantity was 700 mJ/cm$^2$ with UV-LEDs in UV-irradiating devices mounted on the sides of the carriage. Thus, recorded matters where the solid pattern images were printed on PVC films were prepared.

4.4. Evaluation Test

The resulting recorded matters were evaluated by the following tests. The evaluation tests were all performed at room temperature.

4.4.1. Evaluation of Agglomeration Spots (Gloss Unevenness)

The resulting recorded matters were visually evaluated for the presence or absence of agglomeration spots (gloss unevenness). The evaluation criteria are as follows:
A: no agglomeration spots occurred on the surface of a recorded matter, and gloss was recognized on the surface;
B: agglomeration spots slightly occurred on the surface of a recorded matter, and gloss unevenness was observed on the surface; and C: distinct agglomeration spots occurred on the surface of a recorded matter, and gloss unevenness was recognized on the surface.

Note that criteria "A" is most desirable in the evaluation of agglomeration spots (gloss unevenness).

4.4.2. Evaluation of Flexibility

Each recorded matter was cut into a predetermined size (the length at this stage was defined as $L_0$) and set to a tensile tester (a product of A&D Co., Ltd.). The recorded matter was stretched at a tensile rate of 100 mm/min with the tensile tester, and the moment that cracking or peeling (hereinafter, referred to as "cracking, etc.") occurred in the recorded matter was visually confirmed. The length of the stretched recorded matter was calculated based on the time from the starting of the stretching till occurrence of cracking, etc. and was defined as $L_1$. The flexibility of the recorded matter was evaluated by calculating the degree (%) of elongation at occurrence of cracking, etc. in the image formed on the PVC film from the following expression:

$$\text{Degree (\%) of elongation at occurrence of cracking, etc. in image} = [(L_1 - L_0)/L_0] \times 100 \quad (1)$$

The evaluation criteria are as follows:
AAA: the degree of elongation is 180% or more;
AA: the degree of elongation is 160% or more but less than 180%;
A: the degree of elongation is 140% or more but less than 160%;
B: the degree of elongation is 120% or more but less than 140%;
C: the degree of elongation is 100% or more but less than 120%; and
D: the degree of elongation is less than 100%.

4.4.3. Evaluation of Adhesion

The adhesion between the PVC film and the image was evaluated in accordance with JIS K 5600-5-6 (Testing methods for paints—Part 5: Mechanical property of film—Section 6: Adhesion test (Cross-cut test)). The evaluation criteria are as follows:
0: edges of cuts are completely smooth, and no peeling occurs in all grid sections;
1: small peeling of film is recognized at intersections of cuts;
2: film is peeled along edges and/or at intersections of cuts;
3: film is partially or entirely peeled along edges of cuts and/or partially or entirely peeled at various portions of grid sections;
4: film is partially or entirely peeled along edges of cuts and/or partially or entirely peeled at several grid sections; and
5: the degree of peeling is higher than criteria 4.

4.5. Evaluation Results

The results of the evaluation tests are also shown in Tables 1 and 2. Table 1 shows the results of the radiation-curable black ink compositions, and Table 2 shows the results of the radiation-curable yellow ink compositions.

TABLE 1

| | | Component | Example 1 | Example 2 | Example 3 | Example 4 | Comparative Example 1 | Comparative Example 2 | Comparative Example 3 |
|---|---|---|---|---|---|---|---|---|---|
| Reaction component | Component (A) (mass %) | Phenoxyethyl acrylate | 52.0 | 26.7 | 30.7 | 20.0 | 65.6 | 18.5 | |
| | Component (B) (mass %) | Tetraethylene glycol diacrylate | | | | 7.0 | 5.1 | 25.0 | |
| | | Tripropylene glycol diacrylate | | 25.0 | 23.0 | | | 25.0 | 25.0 |
| | | Dipropylene glycol diacrylate | 23.5 | 25.0 | 23.0 | 25.1 | 9.4 | 12.5 | 49.4 |
| | Component (C) (mass %) | N-Vinyl caprolactam | 14.0 | 18.9 | 13.3 | 5.6 | | 10.0 | 21.2 |
| | Component (D) (mass %) | Aminoacrylate | 3.7 | 4.4 | 4.0 | 7.0 | 3.5 | 4.5 | 4.4 |
| | Component (E) (mass %) | Dicyclopentenyloxyethyl acrylate | | | 6.0 | | 16.4 | 4.5 | |
| | | Isobornyl acrylate | 6.8 | | | 35.3 | | | |
| | Total amount | | 100.0 | 100.0 | 100.0 | 100.0 | 100.0 | 100.0 | 100.0 |
| Additive | Photopolymerization initiator (parts by mass) | IRGACURE 819 | 6.0 | 6.0 | 6.0 | 6.0 | 6.0 | 6.0 | 6.0 |
| | | DAROCUR TPO | 5.0 | 5.0 | 5.0 | 5.0 | 5.0 | 5.0 | 5.0 |
| | | DETX | 2.0 | 2.0 | 2.0 | 2.0 | 2.0 | 2.0 | 2.0 |
| | Slip agent (parts by mass) | BYK-UV 3500 | 0.2 | 0.2 | 0.2 | 0.2 | 0.2 | 0.2 | 0.2 |
| | Polymerization inhibitor (parts by mass) | p-Methoxyphenol | 0.2 | 0.2 | 0.2 | 0.2 | 0.2 | 0.2 | 0.2 |
| | Pigment (parts by mass) | Carbon black | 2.5 | 2.5 | 2.5 | 2.5 | 2.5 | 2.5 | 2.5 |
| | Dispersant (parts by mass) | Solsperse 36000 | 0.5 | 0.5 | 0.5 | 0.5 | 0.5 | 0.5 | 0.5 |
| Evaluation result | Agglomeration spot (gloss unevenness) | PVC film | A | A | A | A | C | A | A |
| | Cracking etc. Degree of elongation (%) | PVC film | AA | C | B | A | AAA | D | D |
| | Adhesion | PVC film | 0 | 0 | 0 | 0 | 5 | 0 | 0 |

TABLE 2

|  | Component | | Example 5 | Example 6 | Example 7 | Comparative Example 4 | Comparative Example 5 | Comparative Example 6 |
|---|---|---|---|---|---|---|---|---|
| Reaction component | Component (A) (mass %) | Phenoxyethyl acrylate | 45.0 | 53.0 | 25.6 | 58.9 | 53.3 | 15.6 |
| | Component (B) (mass %) | Tetraethylene glycol diacrylate | 15.0 | | 12.0 | | | |
| | | Tripropylene glycol diacrylate | | 6.0 | 12.0 | | 4.0 | 30.0 |
| | | Dipropylene glycol diacrylate | 15.0 | 7.0 | 25.0 | | 4.0 | 30.0 |
| | Component (C) (mass %) | N-Vinyl caprolactam | 15.0 | 20.0 | 15.4 | 13.7 | 14.2 | 13.6 |
| | Component (D) (mass %) | Aminoacrylate | 4.5 | 4.5 | 4.5 | 4.5 | 4.5 | 4.5 |
| | Component (E) (mass %) | Dicyclopentenyloxyethyl acrylate | 5.5 | 9.5 | 5.5 | 22.9 | 20.0 | 6.3 |
| | Total amount | | 100.0 | 100.0 | 100.0 | 100.0 | 100.0 | 100.0 |
| Additive | Photopolymerization initiator (parts by mass) | IRGACURE 819 | 6.0 | 5.5 | 5.0 | 5.5 | 5.5 | 5.0 |
| | | DAROCUR TPO | 5.0 | 4.5 | 4.5 | 4.5 | 4.5 | 4.5 |
| | | DETX | 3.0 | 1.5 | 1.5 | 1.5 | 1.5 | 1.5 |
| | Slip agent (parts by mass) | BYK-UV 3500 | 0.2 | 0.2 | 0.2 | 0.2 | 0.2 | 0.2 |
| | Polymerization inhibitor (parts by mass) | p-Methoxyphenol | 0.2 | 0.2 | 0.2 | 0.2 | 0.2 | 0.2 |
| | Pigment (parts by mass) | Pigment yellow 180 | 3.0 | 3.0 | 3.0 | 3.0 | 3.0 | 3.0 |
| | Dispersant (parts by mass) | Solsperse 36000 | 0.6 | 0.6 | 0.6 | 0.6 | 0.6 | 0.6 |
| Evaluation result | Agglomeration spot (gloss unevenness) | PVC film | A | A | A | B | B | A |
| | Cracking etc. | PVC film | A | AA | C | AAA | AA | D |
| | Degree of elongation (%) | | | | | | | |
| | Adhesion | PVC film | 0 | 0 | 0 | 0 | 0 | 0 |

In the radiation-curable black ink compositions of Examples 1 to 4 shown in Table 1 and the radiation-curable yellow ink compositions of Examples 5 to 7 shown in Table 2, no agglomeration spots occurred on the surface of every recorded matter, and gloss was confirmed on the surface. In addition, since the degree of elongation at occurrence of cracking, etc. was 100% or more, the results showed that every recorded matter was excellent in flexibility and also that the adhesion was satisfactory.

On the other hand, in the radiation-curable black ink composition of Comparative Example 1 shown in Table 1 containing component (A) in an amount of larger than 55 mass % and component (B) in an amount smaller than 20 mass % of the total reaction components, distinct agglomeration spots occurred on the surface of the recorded matter, and gloss unevenness was recognized on the surface. In addition, since the ink composition did not contain component (C), the result showed that the adhesion between the recording medium and the recorded matter recorded thereon was insufficient.

In the radiation-curable black ink composition of Comparative Example 2 shown in Table 1 containing component (A) in an amount of smaller than 20 mass % and component (B) in an amount larger than 50 mass % of the total reaction components, the degree of elongation at occurrence of cracking, etc. was less than 100%, and the result showed that the flexibility of the recorded matter was insufficient.

In the radiation-curable black ink composition of Comparative Example 3 shown in Table 1 containing component (B) in an amount larger than 50 mass % of the total reaction components and not containing component (A), the degree of elongation at occurrence of cracking, etc. was less than 100%, and the result showed that the flexibility of the recorded matter was insufficient.

In the radiation-curable yellow ink composition of Comparative Example 4 shown in Table 2 not containing component (B) in the reaction components, agglomeration spots occurred slightly on the surface of the recorded matter, and gloss unevenness was recognized on the surface. However, since the content of component (A) was larger than 55 mass %, the flexibility of the recorded matter was notably excellent.

In the radiation-curable yellow ink composition of Comparative Example 5 shown in Table 2 containing component (B) in an amount smaller than 10 mass % of the total reaction components, agglomeration spots occurred slightly on the surface of the recorded matter, and gloss unevenness was observed on the surface. However, the ink composition contained component (A) in an amount of 53.3 mass %, the recorded matter was excellent in flexibility of the recorded matter.

In the radiation-curable yellow ink composition of Comparative Example 6 shown in Table 2 containing component (B) in an amount larger than 50 mass % of the total reaction components, no agglomeration spots occurred on the surface of the recorded matter, and the gloss was recognized on the surface. However, since the content of component (A) was smaller than 20 mass %, the degree of elongation at occurrence of cracking, etc. was smaller than 100%, and the result showed the flexibility of the recorded matter was insufficient.

The invention is not limited to the above-described embodiments, and various modifications are possible. For example, the invention includes substantially the same structures as those described in the embodiments (for example, a structure in which the function, the method, and the results are the same or a structure in which the purpose and the effect are the same). The invention includes structures in which portions that are not essential in the structures described in the embodiments are substituted. The invention includes structures that perform the same functions and effects or structures that can achieve the same purpose as those described in the embodiments. The invention includes structures in which known technologies are added to the structures described in the embodiments.

What is claimed is:

1. A radiation-curable ink composition comprising:
   phenoxyethyl acrylate (A) in an amount of from 20 to 55 mass % of the total reaction components;
   a multifunctional acrylate (B) in an amount of from 20 to 50 mass % of the total reaction components;
   a monofunctional acrylate (E) having an alicyclic structure as a reaction component in an amount of 5 to 50 mass % of the total reaction components; and a black pigment (F1),
wherein the multifunctional acrylate (B) is at least one selected from the group consisting of dipropylene glycol diacrylate, tripropylene glycol diacrylate, tetraethylene glycol diacrylate, tricyclodecane dimethanol diacrylate, and propoxylated neopentyl glycol diacrylate.

2. A radiation-curable ink composition comprising:
phenoxyethyl acrylate (A) in an amount of from 20 to 55 mass % of the total reaction components;
a multifunctional acrylate (B) in an amount of from 10 to 50 mass % of the total reaction components;
a monofunctional acrylate (E) having an alicyclic structure as a reaction component in an amount of 5 to 50 mass % of the total reaction components; and
a yellow pigment (F2),
wherein the multifunctional acrylate (B) is at least one selected from the group consisting of dipropylene glycol diacrylate, tripropylene glycol diacrylate, tetraethylene glycol diacrylate, tricyclodecane dimethanol diacrylate, and propoxylated neopentyl glycol diacrylate.

3. The radiation-curable ink composition according to claim 1, the ink composition further comprising N-vinyl caprolactam (C) as a reaction component.

4. The radiation-curable ink composition according to claim 1, the ink composition further comprising an aminoacrylate (D) as a reaction component.

5. The radiation-curable ink composition according to claim 1, wherein the monofunctional acrylate (E) having an alicyclic structure is at least one selected from the group consisting of dicyclopentenyl acrylate, dicyclopentanyl acrylate, and dicyclopentenyloxyethyl acrylate.

6. The radiation-curable ink composition according to claim 1, the ink composition having a viscosity of from 10 to 40 mPa·s at 20° C. and a surface tension of from 20 to 30 mN/m at 20° C.

7. An ink jet recording method comprising the steps of:
(a) discharging a radiation-curable ink composition according to claim 1 onto a recording medium; and
(b) irradiating the discharged radiation-curable ink composition with active radiation having a peak emission wavelength ranging from 350 to 400 nm using an active radiation source.

8. A recorded matter recorded by the ink jet recording method according to claim 7.

9. The radiation-curable ink composition according to claim 2, the ink composition further comprising N-vinyl caprolactam (C) as a reaction component.

10. The radiation-curable ink composition according to claim 2, the ink composition further comprising an aminoacrylate (D) as a reaction component.

11. The radiation-curable ink composition according to claim 2, wherein the monofunctional acrylate (E) having an alicyclic structure is at least one selected from the group consisting of dicyclopentenyl acrylate, dicyclopentanyl acrylate, and dicyclopentenyloxyethyl acrylate.

12. The radiation-curable ink composition according to claim 2, the ink composition having a viscosity of from 10 to 40 mPa·s at 20° C. and a surface tension of from 20 to 30 mN/m at 20° C.

13. An ink jet recording method comprising the steps of:
(a) discharging a radiation-curable ink composition according to claim 2 onto a recording medium; and
(b) irradiating the discharged radiation-curable ink composition with active radiation having a peak emission wavelength ranging from 350 to 400 nm using an active radiation source.

14. A recorded matter recorded by the ink jet recording method according to claim 13.

15. The radiation-curable ink composition according to claim 1, wherein when the ink composition is deposited to form an image on a surface of a polyvinyl chloride film, agglomeration spots are prevented from occurring thereon, and wherein the polyvinyl chloride film undergoes a degree of elongation of at least 100% before cracking of the image occurs.

16. The radiation-curable ink composition according to claim 15, further comprising N-vinyl caprolactam (C) as a reaction component in an amount of 5 to 20 mass % of the total reaction components, wherein the phenoxyethyl acetate (A) is present in the ink composition in an amount of 40 to 55 mass % of the total reaction components.

17. The radiation-curable ink composition according to claim 2, wherein when the ink composition is deposited to form an image on a surface of a polyvinyl chloride film, agglomeration spots are prevented from occurring thereon, and wherein the polyvinyl chloride film undergoes a degree of elongation of at least 100% before cracking of the image occurs.

18. The radiation-curable ink composition according to claim 17, further comprising N-vinyl caprolactam (C) as a reaction component in an amount of 5 to 20 mass % of the total reaction components, wherein the phenoxyethyl acetate (A) is present in the ink composition in an amount of 40 to 55 mass % of the total reaction components.

* * * * *